(12) United States Patent
Ma

(10) Patent No.: US 6,188,823 B1
(45) Date of Patent: Feb. 13, 2001

(54) METHOD AND APPARATUS FOR PROVIDING DISPERSION AND DISPERSION SLOPE COMPENSATION IN AN OPTICAL COMMUNICATION SYSTEM

(75) Inventor: Xiaobing Ma, Morganville, NJ (US)

(73) Assignee: Tyco Submarine Systems Ltd., Morristown, NJ (US)

( * ) Notice: Under 35 U.S.C. 154(b), the term of this patent shall be extended for 0 days.

(21) Appl. No.: 09/204,041

(22) Filed: Dec. 1, 1998

(51) Int. Cl.[7] ................................................ G02B 6/02
(52) U.S. Cl. ................................................ 385/123
(58) Field of Search ................... 385/123–128; 359/161

(56) References Cited

U.S. PATENT DOCUMENTS 5,448,674 * 9/1995 Vengsarkar et al. ................. 385/123
5,887,093 * 3/1999 Hansen et al. ....................... 385/123
5,956,440 * 9/1999 Mikami et al. ...................... 385/123

* cited by examiner

*Primary Examiner*—Frank G. Font
*Assistant Examiner*—Amanda Merlino

(57) ABSTRACT

An optical transmission system is provided that includes a transmitting terminal, a receiving terminal remotely located from the transmitting terminal, and an optical transmission path connecting the transmitting terminal to the receiving terminal. The optical transmission path includes at least one optical amplifier such that portions of the optical transmission path located between adjacent optical amplifiers or terminals denote a transmission span. The path includes constituent optical fiber having a positive dispersion shift, dispersion compensating optical fiber having a negative dispersion shift, and dispersion slope compensating fiber having a negative dispersion slope.

23 Claims, 2 Drawing Sheets

METHOD AND APPARATUS FOR PROVIDING DISPERSION AND DISPERSION SLOPE COMPENSATION IN AN OPTICAL COMMUNICATION SYSTEM

FIELD OF THE INVENTION

The invention relates generally to optical fiber communication systems and more particularly to an optical fiber communication system in which adverse spectral broadening of the carrier wavelengths arising from nonlinear interactions is avoided.

BACKGROUND OF THE INVENTION

Transmission performance of long-haul optical communication systems such as transoceanic systems is limited by a number of phenomena, including noise, dispersion, and nonlinearities in the refractive index of the fiber. Such systems require dispersion management techniques to mitigate the effects of the fiber's nonlinear index of refraction. Dispersion management for a long transmission line is a technique in which the zero dispersion wavelength of the constituent fibers is arranged to be appropriately far from the system's operating wavelengths while maintaining an appropriately small net dispersion for the whole transmission line. This arrangement is employed because at the zero dispersion wavelength, the signal and the amplified spontaneous emission noise generated by the optical amplifiers travel at similar velocities and thus have the opportunity to mix over long interaction lengths, via the nonlinear refractive index, and generate power at unwanted wavelengths. These interactions can be reduced if the group velocities of the signal and the noise are different so that there is a reduction in the distance over which the interactions occur. Accordingly, fibers having nonzero dispersion are often used to overcome the problems caused by fiber nonlinearities by reducing the interaction length between the signal and noise.

One dispersion management technique is known as dispersion mapping, in which the transmission line is divided into two or more sections approximately equal length. In one section, the optical fiber has a zero dispersion wavelength less than the operating wavelengths. The following section has optical fiber with a zero dispersion wavelength greater than the operating wavelengths. The overall transmission line is thus constructed in a periodic manner from a concatenation of fiber sections having different zero dispersion wavelengths. As a result, nonlinear mixing is minimized by reducing the interaction lengths (i. e. the distance over which there is a good group velocity match) and the distortion to the data is minimized as well. By ensuring that the total accumulated dispersion returns to about zero at the receiving end of the system, temporal distortions of the dispersion itself are also minimized.

FIG. 1 shows a dispersion map for a single wavelength system in which adjacent fiber spans have equal dispersion magnitudes but opposite signs. Each span in this example is 50 km in length. As shown, the accumulated dispersion returns to zero at the remote end of the system. One factor complicating the dispersion map shown in FIG. 1 is that optical fiber generally has a nonzero dispersion slope. That is, different wavelengths experience different dispersion values in a given fiber. As a result, in a WDM transmission system employing a plurality of wavelengths, the dispersion map can return the accumulated dispersion to zero for only one wavelength. Thus, in FIG. 1 the operating wavelength is selected to coincide with the end-to-end zero dispersion wavelength for the system.

FIG. 2 shows a dispersion map for three different wavelengths. As a result of the fiber's non-zero dispersion slope, only one wavelength (the center wavelength) has an accumulated dispersion that is periodically returned to zero. The remaining wavelengths accumulate dispersion at different rates, thus causing the spread in accumulated dispersion seen in FIG. 2 as the wavelengths progress along the transmission path.

In WDM transmission systems operating at high data rates the dispersion slope becomes an important factor limiting system capacity. While conventional dispersion maps adequately manage the dispersion, they fail to successfully manage the dispersion slope, leading to an accumulation of dispersion at wavelengths other than the zero dispersion wavelength of the system.

SUMMARY OF THE INVENTION

In accordance with the present invention, an optical transmission system is provided that includes a transmitting terminal, a receiving terminal remotely located from the transmitting terminal, and an optical transmission path connecting the transmitting terminal to the receiving terminal. The optical transmission path includes at least one optical amplifier such that portions of the optical transmission path located between adjacent optical amplifiers or terminals denote a transmission span. The path includes constituent optical fiber having a positive dispersion shift, dispersion compensating optical fiber having a negative dispersion shift, and dispersion slope compensating fiber having a negative dispersion slope.

In one embodiment of the invention, the transmission path includes a plurality of transmission spans. The dispersion slope compensating fiber is located in the Nth span while dispersion compensating fiber may located in each of the transmission spans. Thus, the present invention advantageously performs dispersion management and dispersion slope management independently of one another because they are performed by different fibers.

DETAILED DESCRIPTION

Figure 3:
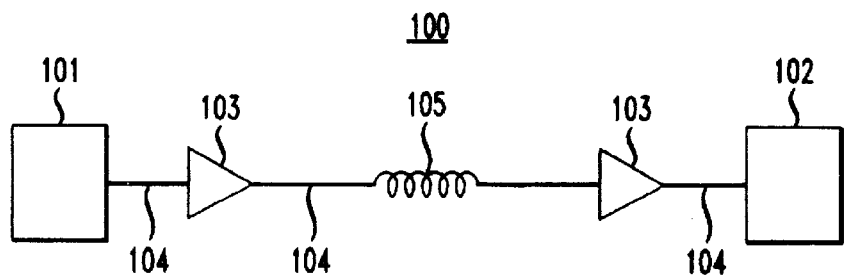
FIG. 3 shows a simplified block diagram of an exemplary optical fiber transmission system in accordance with the present invention.

FIG. 3 shows a simplified block diagram of a conventional optical fiber transmission system in which dispersion is managed by a dispersion mapping technique. The system includes an optical transmission path 100, a transmitting terminal 101, a receiving terminal 102 and one or more optical amplifiers 103. The transmitting terminal 101 provides an optical data signal that is to be transmitted to the remote receiving terminal via the optical fiber transmission path 100. The optical signal presented by the terminal 101 to the transmission path 100 may comprise a plurality of WDM optical carriers on which data is modulated in any appropriate transmission format. For example, an NRZ format is often employed. The transmission path comprises a dispersion map in which a series of transmission sections 104 (referred to as the constituent fibers) are provided which have dispersion shifted fiber spans of negative dispersion. In other words, the constituent transmission fibers have an average zero dispersion wavelength higher than the operating wavelengths of the system. One or more of the constituent fibers 104 are followed by a dispersion-compensating fiber 105 having positive dispersion. This subsequent section of fiber is sufficient to reduce the average dispersion (averaged over the total length of the transmission system) nearly to zero.

The exemplary embodiment of the invention in FIG. 3 shows a single period of the dispersion map consisting of optical amplifiers 103, lengths of transmission fiber 104, and dispersion compensating fiber 105. In a typical long-haul system, this series of components constituting the dispersion map period might be repeated a number of times over the length of the system. The optical amplifiers 103 may be erbium-doped fiber amplifiers (EDFAs), for example, which amplify optical signals in the 980 or 1550 nm wavelength bands.

Figure 1:
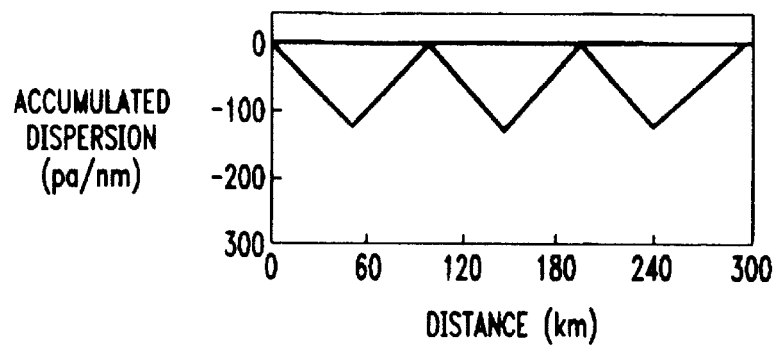
FIG. 1 shows a dispersion map for a single wavelength in a conventional transmission system.
Figure 2:
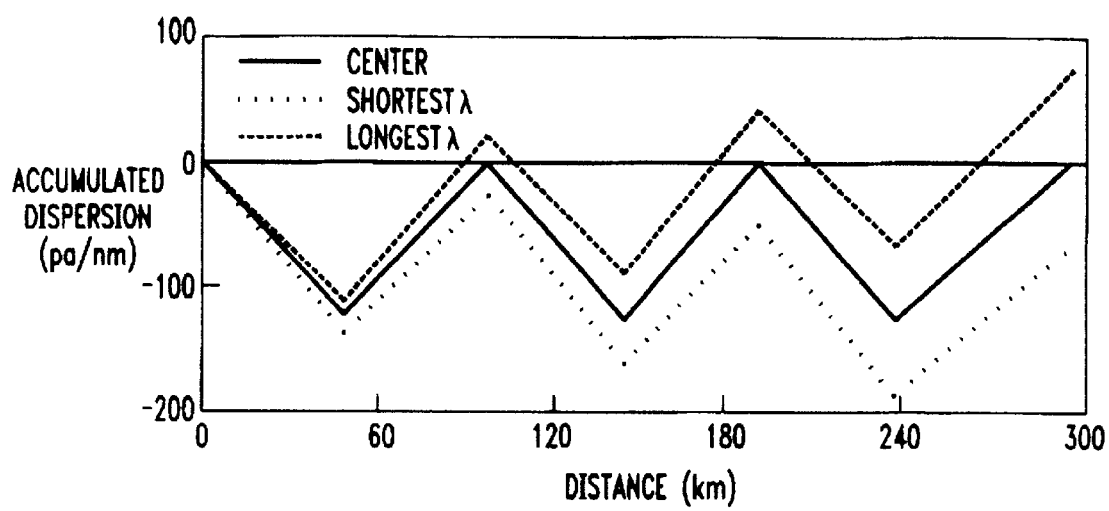
FIG. 2 shows a dispersion map for three different wavelengths.

Currently available optical fiber typically has a dispersion slope that is positive. Thus, in FIG. 3, the dispersion slope for both the constituent fiber and the dispersion compensating fiber is positive. As previously mentioned, this gives rise to the behavior shown in FIG. 2, in which the accumulated dispersion of only one wavelength is periodically returned to zero while the remaining wavelengths continue to accumulate dispersion.

In accordance with the present invention, a dispersion map is employed that compensates for both the dispersion and the dispersion slope. This result is achieved by periodically inserting optical fiber with a negative dispersion slope along the transmission path. The negative dispersion slope fiber compensates for the lengths of positive dispersion slope fiber so that a dispersion map similar to that shown in FIG. 5 arises. In contrast to FIG. 2, in FIG. 5 all the operating wavelengths have accumulated dispersion that is periodically returned to zero.

Figure 4:
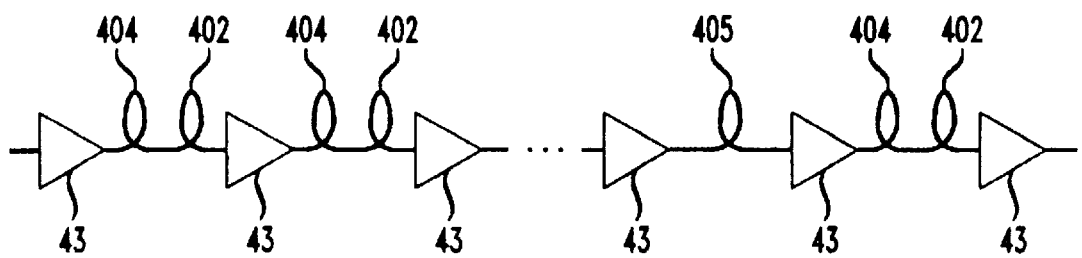
FIG. 4 shows one embodiment of an optical transmission system that employs the dispersion mapping technique of the present invention.

FIG. 4 shows one embodiment of an optical transmission system that employs the dispersion mapping technique of the present invention. The exemplary embodiment of the invention in FIG. 4 shows (N+1) spans (i.e., paths between two adjacent optical amplifiers) consisting of a single period of the dispersion map. Included in the dispersion map period are optical amplifiers 103, sections of constituent transmission fiber 404 having a positive dispersion slope alternating with sections of fiber 402 having a negative dispersion slope, and dispersion compensating fiber 405, which also has a positive dispersion slope. Similar to the dispersion map shown in FIG. 3, the dispersion compensating fiber 405 compensates for the accumulated dispersion in fibers 402 and 404. In addition, however, within a given period, negative dispersion slope fiber 402 compensates for the sections of positive dispersion slope fiber 404 and 405.

In the present invention dispersion management and dispersion slope management may be accomplished independently of one another because they are performed by different fibers (e.g. dispersion compensating fiber 405 and dispersion slope compensating fiber 402, respectively). For example, in FIG. 4, dispersion management is provided every N spans while dispersion slope management is provided within each of the spans. Of course, the present invention is not limited to this particular arrangement. More generally, dispersion and dispersion slope management may be provided by concatenation of different fiber sections in any configuration appropriate for a particular application. For example, in some cases it may be desirable to provide dispersion management in every other span while only providing dispersion slope management in every Nth span.

In some embodiments of the invention it may be advantageous to locate the dispersion slope compensating fiber 402 downstream from the constituent fiber 404. That is, in a given span, the dispersion slope compensating fiber 402 may immediately precede the optical amplifier, as in the FIG. 4 embodiment. Such an arrangement reduces nonlinear interactions that arise as a consequence of using optical fiber having a negative dispersion slope. Negative dispersion slope fiber inherently has a smaller effective cross-sectional area than positive dispersion slope fiber and as result the power intensity will be greater in the negative dispersion slope fiber than in the positive dispersion slope fiber, thus increasing nonlinearities in the negative dispersion slope fiber. By situating the negative dispersion slope fiber at a point along the transmission span where the optical power is already relatively low (i.e., immediately preceding an optical amplifier), nonlinear impairments can be minimized.

Figure 5:
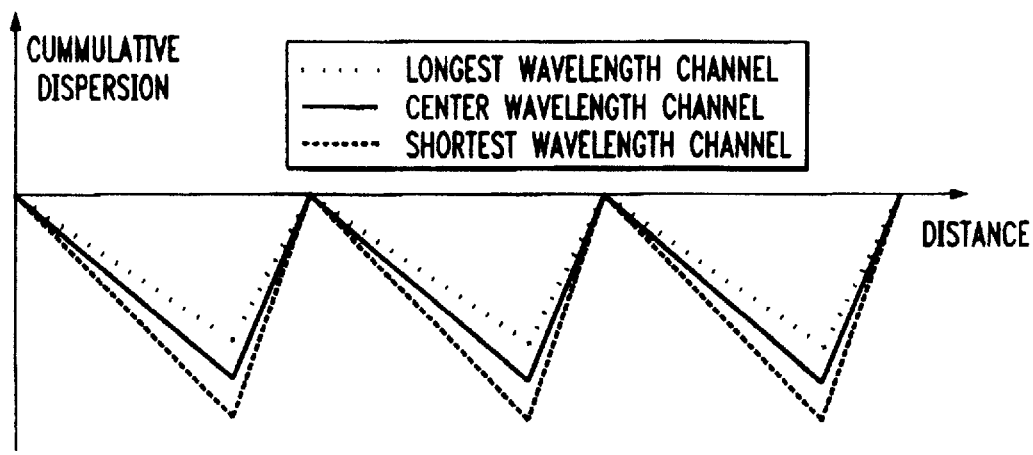
FIGS. 5 and 6 shows a dispersion map for three different wavelengths in accordance with the present invention.
Figure 6:
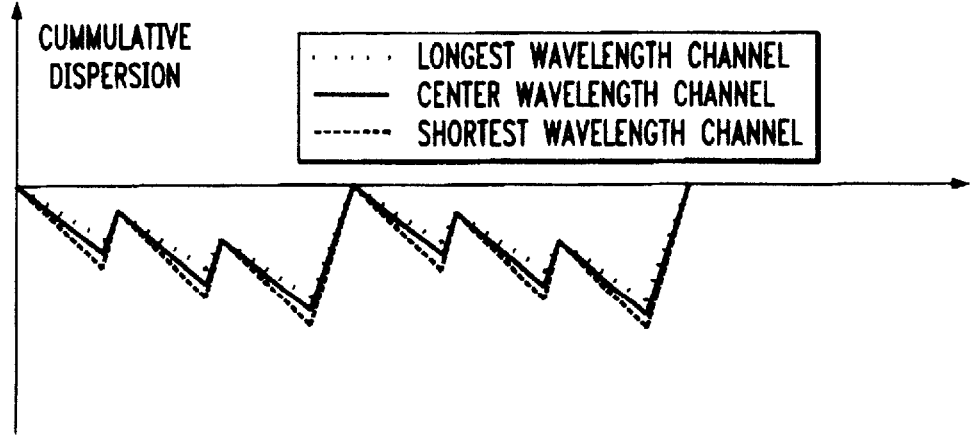

In some circumstances it may not be desirable to completely compensate for the dispersion so that the accumulated dispersion of all the operating wavelengths is periodically returned to zero, as in FIG. 5. Rather, as shown in FIG. 6, it may be advantageous if one or more of the wavelengths accumulate a small amount of dispersion. Complete compensation reduces the walkoff among wavelengths to zero. A walkoff of zero is undesirable because it enhances interchannel interference. Thus, by only partially compensating for the dispersion and dispersion slope so that some dispersion accumulates, a small amount of walkoff will be produced, reducing interchannel interference. Of course, the degree to which the dispersion and dispersion slope should be compensated will depend on the particulars of the transmission system undergoing compensation.

What is claimed is:

1. An optical transmission system comprising:

a transmitting terminal;

a receiving terminal remotely located from the transmitting terminal;

an optical transmission path connecting said transmitting terminal to said receiving terminal, said optical transmission path including at least one optical amplifier such that portions of the optical transmission path located between adjacent optical amplifiers or between said transmitting terminal and a first of said at least one optical amplifier or between the last of said at least one optical amplifier and the receiving terminal denote a transmission span, said path including;

constituent optical fiber having a positive dispersion shift;

dispersion compensating optical fiber having a negative dispersion shift;

dispersion slope compensating fiber having a negative dispersion slope.

2. The system of claim 1 wherein said dispersion compensating optical fiber and said dispersion slope compensating fiber are located in different transmission spans.

3. The system of claim 1 further comprising a plurality of transmission spans wherein said dispersion slope compensating fiber is located in the Nth span.

4. The system of claim 3 wherein said dispersion compensating fiber is located in each of said transmission spans.

5. The system of claim 3 wherein said constituent fiber and said dispersion compensating fiber are located in each of the transmission spans.

6. The system of claim 5 where in s aid constituent fiber precedes in a downstream direction said dispersion compensating fiber.

7. A method of transmitting an optical signal through an optical transmission path that includes at least one optical amplifier such that portions of the optical transmission path located between adjacent optical amplifiers or between said transmitting terminal and a first of said at least one optical amplifier or between the last of said at least one optical amplifier and the receiving terminal denote a transmission span, said path including;

generating an optical signal;

transmitting said optical signal through constituent optical fiber having a positive dispersion shift;

periodically providing dispersion compensation with dispersion compensating optical fiber having a negative dispersion shift;

periodically providing dispersion slope compensation with dispersion slope compensating fiber having a negative dispersion slope.

8. The method of claim 7 wherein said dispersion compensation and said dispersion slope compensation are provided in different transmission spans.

9. The method of claim 7 further comprising a plurality of transmission spans wherein said dispersion slope compensation is provided in the Nth span.

10. The method of claim 9 wherein said dispersion compensation is provided in each of said transmission spans.

11. The method of claim 7 wherein said dispersion compensation immediately precedes optical amplification.

12. An optical transmission path comprising:

a first optical fiber adapted to receive an optical signal from a transmitting terminal;

a second optical fiber adapted to transmit the optical signal to a receiving terminal remotely located from the transmitting terminal;

a dispersion compensating path connecting said first optical fiber to said second optical fiber, said dispersion compensating path including at least one optical amplifier such that portions of the dispersion compensating path located between adjacent optical amplifiers or between said transmitting terminal and a first of said at least one optical amplifier or between the last of said at least one optical amplifier and the receiving terminal denote a transmission span, said dispersion compensating path including;

constituent optical fiber having a positive dispersion shift;

dispersion compensating optical fiber having a negative dispersion shift;

dispersion slope compensating fiber having a negative dispersion slope.

13. The path of claim 12 wherein said dispersion compensating optical fiber and said dispersion slope compensating fiber are located in different transmission spans.

14. The path of claim 12 further comprising a plurality of transmission spans wherein said dispersion slope compensating fiber is located in the Nth span.

15. The path of claim 14 wherein said dispersion compensating fiber is located in each of said transmission spans.

16. The path of claim 14 wherein said constituent fiber and said dispersion compensating fiber are located in each of the transmission spans.

17. The path of claim 16 wherein said constituent fiber precedes in a downstream direction said dispersion compensating fiber.

18. The system of claim 1 wherein the dispersion compensating optical fiber substantially compensates for accumulated dispersion in the constituent optical fiber.

19. The system of claim 1 wherein the dispersion compensating optical fiber compensates for a select amount of accumulated dispersion in the constituent optical fiber such that a nonzero walkoff is obtained among different optical wavelengths.

20. The path of claim 12 wherein the dispersion compensating optical fiber substantially compensates for accumulated dispersion in the constituent optical fiber.

21. The path of claim 12 wherein the dispersion compensating optical fiber compensates for a select amount of accumulated dispersion in the constituent optical fiber such that a nonzero walkoff is obtained among different optical wavelengths.

22. The method of claim 7 wherein the dispersion compensation that is provided substantially compensates for accumulated dispersion in the constituent optical fiber.

23. The method of claim 7 wherein the dispersion compensation that is provided compensates for a select amount of accumulated dispersion in the constituent optical fiber.

* * * * *